Feb. 9, 1932.  C. J. KELLER  1,844,766
MACHINE FOR SEPARATING ENDS OF CABLE WIRES
Filed Dec. 8, 1930    4 Sheets-Sheet 1

Inventor
Clarence J. Keller

By Spencer Hardman & Fehr
His Attorneys

Feb. 9, 1932.  C. J. KELLER  1,844,766
MACHINE FOR SEPARATING ENDS OF CABLE WIRES
Filed Dec. 8, 1930  4 Sheets-Sheet 3

INVENTOR
Clarence J. Keller
By Spencer Hardman y Fehr
His Attorneys

Feb. 9, 1932.  C. J. KELLER  1,844,766
MACHINE FOR SEPARATING ENDS OF CABLE WIRES
Filed Dec. 8, 1930   4 Sheets-Sheet 4
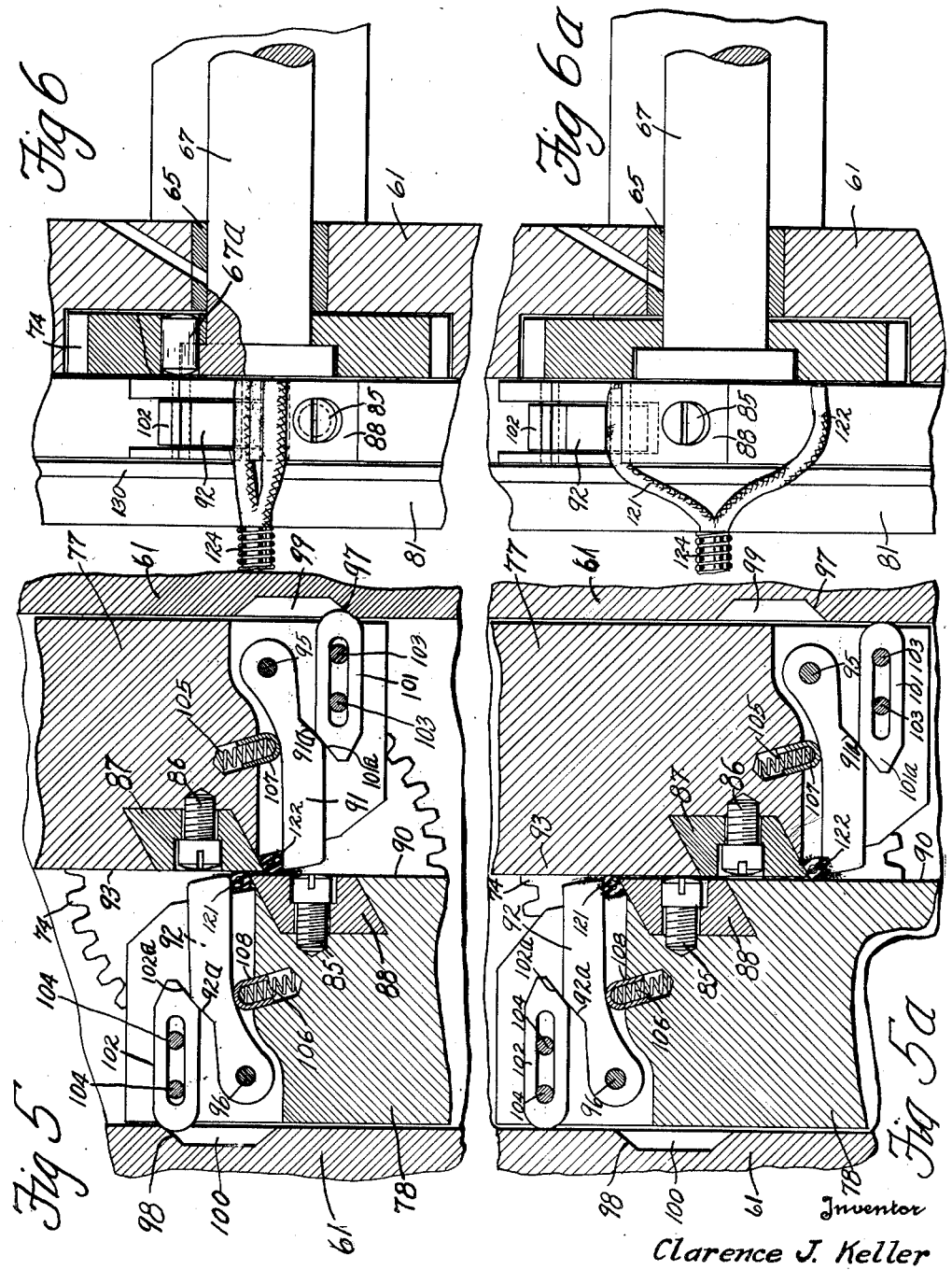
Inventor
Clarence J. Keller
By Spencer Hardman & Fehr
His Attorneys Patented Feb. 9, 1932

1,844,766

UNITED STATES PATENT OFFICE

CLARENCE J. KELLER, OF ANDERSON, INDIANA, ASSIGNOR TO DELCO-REMY CORPORATION, OF ANDERSON, INDIANA, A CORPORATION OF DELAWARE

MACHINE FOR SEPARATING ENDS OF CABLE WIRES

Application filed December 8, 1930. Serial No. 500,964.

This invention relates to the manufacture of electrical conductors, for example the conductors which are used to connect electrical apparatus used on an automobile. Where any piece of electrical apparatus requires that two or more wires be connected with it in order to complete an electric circuit the practice generally is to use a cable of separately insulated wires bundled together and encased by a sheath of woven or braided threads. A piece of cable of the desired length is cut off from the supply, and, in order that the several wires of the cable may be connected with the terminals of an electrical device it is necessary to cut away or fray out the sheath of braided threads a short distance from the end of the cable in order that the wires may be separated from each other so that they may be stripped of their insulation and secured directly to terminal posts or to suitable terminal clips.

One of the objects of the present invention is to provide a machine by which a portion of the cable sheath is stripped away from the end of the cable in order to expose the insulated wires in the cable. The disclosed embodiment of the present invention comprises a pair of knives which split the cable longitudinally a certain distance from its end, thus dividing the cable into two portions, each portion including an insulated wire and a portion of the sheath. After the cable is thus split, the end portions of the insulated wires are gripped by means which pulls them still further apart in order to tear or fray out the sheath to a still greater distance from the end of the cable.

In some of its aspects the present invention constitutes an improvement in the insulation stripping device disclosed in the copending application of John Q. Holmes, Serial No. 418,970, filed January 6, 1930.

Further objects and advantages of the present invention will be apparent from the following description, reference being had to the accompanying drawings wherein a preferred embodiment of one form of the present invention is clearly shown.

In the drawings:

Fig. 5 is a fragmentary, sectional view taken on the line 5—5 of Fig. 3 showing the position of parts of the machine after having cut through a portion of the braided sheath and after having separated the insulated wires of the cable.

Fig. 6 is a fragmentary, sectional view taken on the line 3—3 of Fig. 2 and showing the position of parts of the machine corresponding to that shown in Fig. 5.

Figure 1:
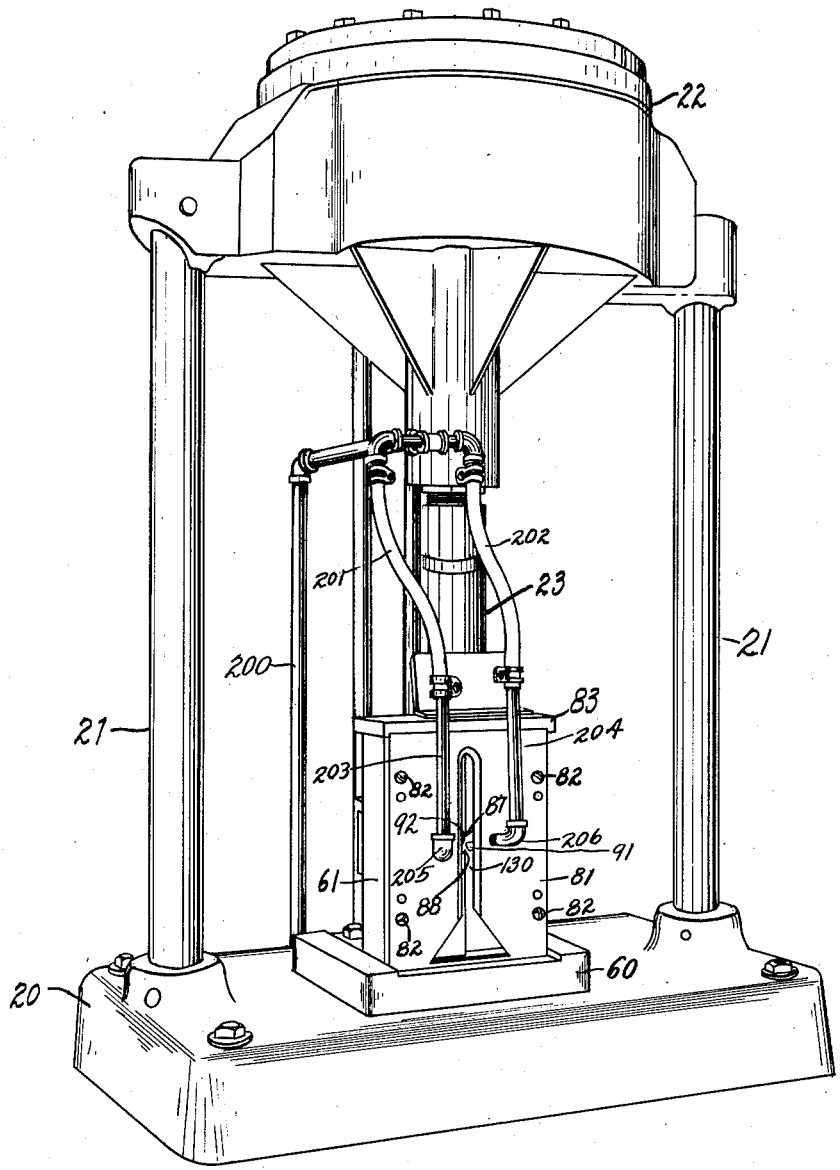
Fig. 1 is a perspective view as viewed from the front and right hand side of a machine embodying the present invention.

Fig. 5a and 6a are views similar to views 5 and 6 respectively and show positions of parts of the machine after having split and torn apart the braided insulation nearly to the flexible metal tube which incloses the cable.

The apparatus is supported by a table 20 having posts 21 supporting a fluid pressure cylinder 22 which cooperates with a piston (not shown) attached to a rod 23 for operating the apparatus.

The table 20 supports a block 60 to which a frame 61 is secured by screws 62 into which a bearing bracket 63 is attached by screws 64. The frame 61 provides a bearing 65 and the bracket 63 provides a bearing 66 for a shaft 67 to which is attached a gear 68 meshing with a rack 69 attached to the rod 23.

The frame 61 provides grooves 70 and 71 which are guides for vertical movement racks 72 and 73 respectively meshing with a gear 74 which is attached to the driver shaft 67 by a key 67a. When the rod 23 moves downwardly the gears 68 and 74 will be moved in a clockwise direction due to the downward movement of the rack 69, thereby causing the rack 73 to move downwardly and the rack 72 upwardly. Screws 75 attach to the rack 73 a block 77. Screws 76 attach to the rack 72 a block 78 similar to the block 77. The front faces of the blocks 77 and 78 are subtantially flush with the front faces 79 and 80 of the frame 61. A cover 81 attached by screws 82 to the frame 61 maintains the blocks and racks in position within the frame 61. The upper surfaces of the frame 61 and of the cover 81 are covered by a top plate 83 attached to the frame 61 by screws 84.

Cable sheath splitting knives 87 and 88 are attached to blocks 77 and 78 respectively by screws 86 and 85 respectively. As shown in Figs. 5 and 5a the right hand side surface 90 of the block 78 cooperates with a wire gripping finger 91 movable with the block 77, and the block 78 carries a wire gripping finger 92 which cooperates with the left hand side surfaces 93 of the block 77. The fingers 91 and 92 are mounted respectively upon pivot pins 95 and 96 respectively carried by the blocks 77 and 78 respectively. The fingers 91 and 92 have camming surfaces 91a and 92a respectively which cooperate with the beveled camming surfaces 101a and 102a, respectively, provided by slide bars 101 and 102 which are guided by pins 103 and 104 respectively carried by the blocks 77 and 78 respectively. The rounded ends of bars 101 and 102 are normally received by notches 99 and 100 respectively cut in the side walls of the frame 61 and these rounded ends cooperate with beveled camming surfaces 97 and 98 respectively bounding the notches 99 and 100 respectively. The levers 91 and 92 are yieldingly urged away from the shear blocks 87 and 88 by springs 105 and 106 respectively carried by blocks 77 and 78 respectively and urging plungers 107 and 108 respectively against levers 91 and 92 respectively.

Figure 2:
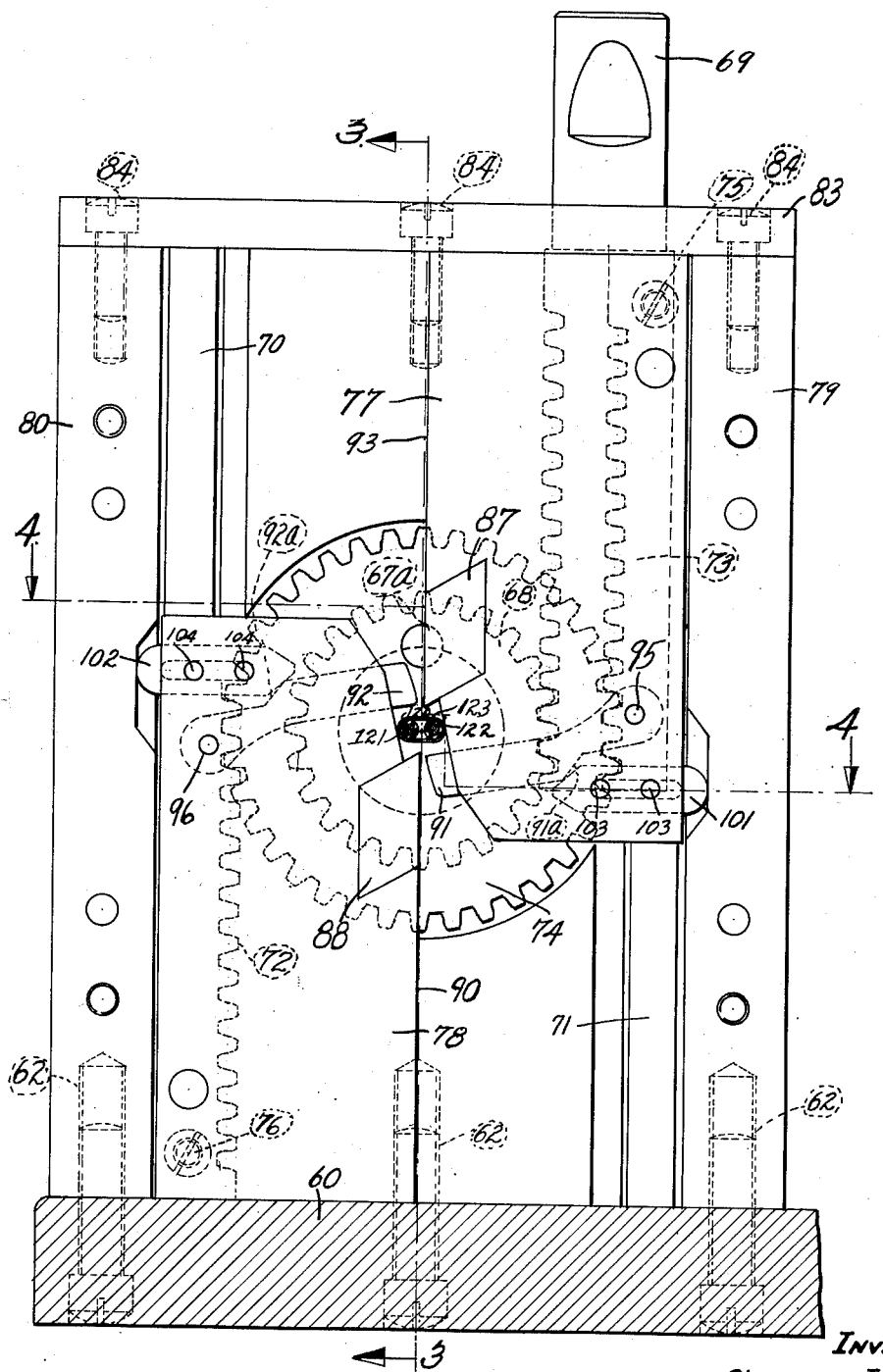
Fig. 2 is a front elevation, partly in section, the section being taken on the line 2—2 of Fig. 3.
Figures 3, 4:
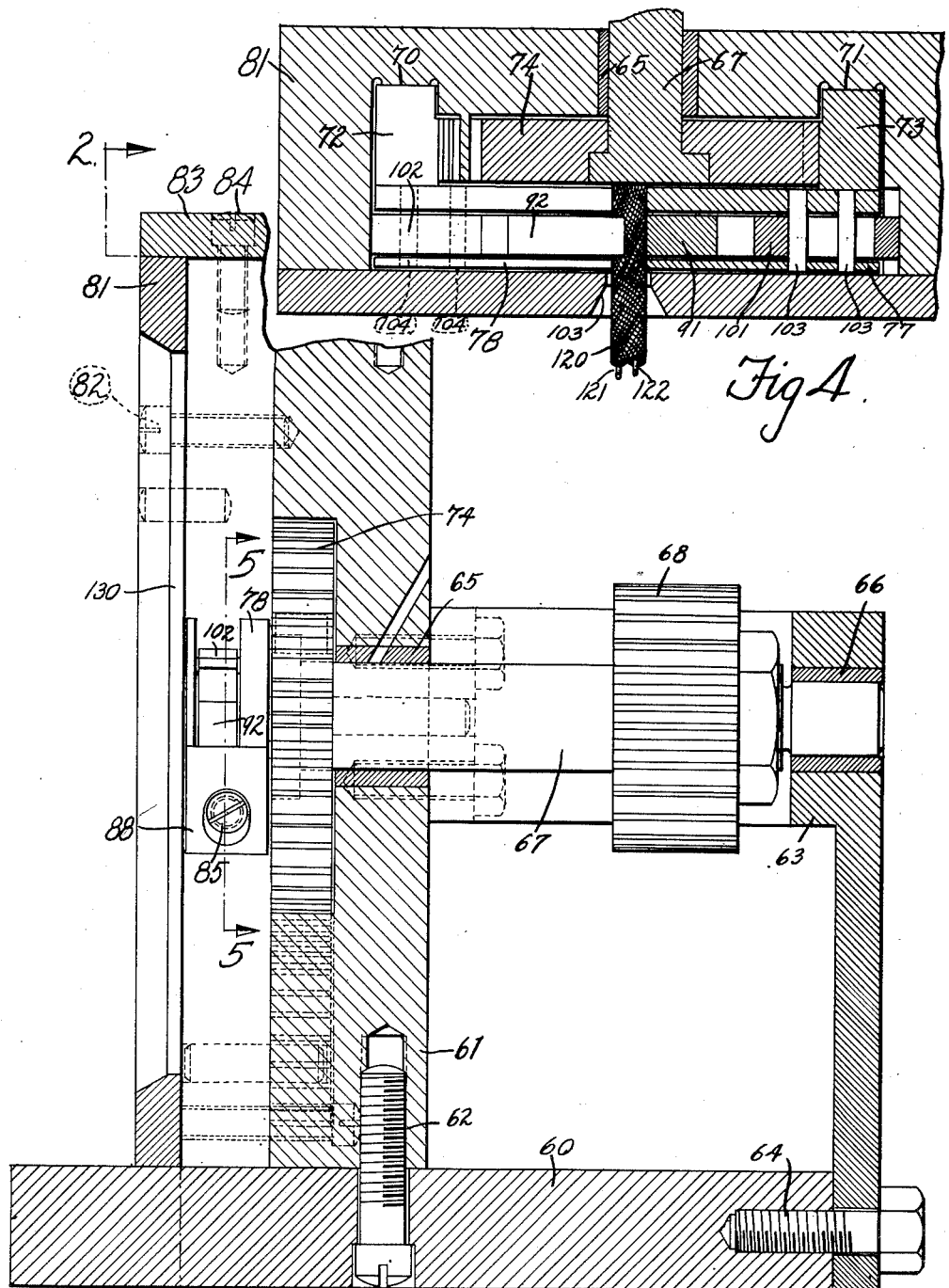
Fig. 3 is a sectional view on the line 3—3 of Fig. 2.
Fig. 4 is a sectional view on the line 4—4 of Fig. 2.

The manner of using the invention is as follows. A cable 120 comprising a pair of insulated wires 121 and 122 encased in a braided sheath 123 and a flexible metal tube or armor is first stripped of its armor 124 a certain distance back from the end of the cable whose insulated wires are to be separated. The end of the conductor bared of the armor covering 124 is inserted through the vertical slot 130 in the front of the cover plate 81 and is located between the cutting edges of the shear blocks 87 and 88 as shown in Fig. 2. By a suitable valve (not shown) air is admitted to the upper end of the cylinder 22 whereupon the rod 23 will move downwardly to cause the blocks 77 and 78 to move from the position shown in Fig. 5 to that shown in Fig. 5a. During movement of the blades 87 and 88 into the positions shown in Fig. 5 the insulating sheath 123 is cut part way from the end of the conductor and the fingers 91 and 92 begin to move respectively toward the blades 87 and 88 due to the cooperation between the bars 101 and 102 respectively with the cams 97 and 98 respectively. As the blocks 77 and 78 move from the position shown in Fig. 5 to that shown in Fig. 5a the fingers 91 and 92 are caused to advance still further toward the shear blocks 87 and 88 respectively in order to clamp the insulated conductors 122 and 121 respectively against the blocks 87 and 88 respectively. Therefore, one portion of the braided sheath clamped against the insulation of one wire is ripped away from the other portion of the braided sheath clamped against the other wire. In this way the sheath is pulled apart starting with the place where it was cut apart by the shear blades 87 and 88.

Referring to Fig. 1 a pipe 200 conducts air through hose 201 and 202 to pipes 203 and 204 respectively connected with L's 205 and 206 respectively threaded into tapped holes leading through the front plate 81. A suitable pedal (not shown) is used to operate the air valve which controls the admission of pressure fluid to the cylinder 22. A spring (not shown) may be employed to restore the pedal to normal position in which position the pedal operated valve causes air to pass to the lower end of the cylinder 22 while the upper end of the cylinder is vented. Thus the piston rod 23 is raised to cause the apparatus to return to normal condition shown in Figs. 1 and 2. During the return of the piston in the cylinder to upper position air is caused to flow into the pipe 200 and its connections so that air will be blown into the apparatus to clean out particles of frayed insulating sheath material.

While the form of embodiment of the present invention as herein disclosed, constitutes a preferred form, it is to be understood that other forms might be adopted, all coming within the scope of the claims which follow.

What is claimed is as follows:

1. Machine for separating the wires of a cable having insulated wires surrounded by a sheath of braided or woven material, comprising in combination, pairs of wire gripping members, each pair of members adapted to grip a wire, means for moving said pairs of gripping members in opposite directions respectively, and means responsive to said movement of the pairs of gripping means for causing a gripping member of each pair to apply gripping pressure to a wire in a direction substantially longitudinally with respect to the direction of bodily movement of the pairs of gripping members.

2. Machine for separating the wires of a cable having insulated wires surrounded by a sheath of braided or woven material, comprising in combination, two oppositely movable cutting blades for splitting the sheath partway in from the end of the cable, each blade being engageable with a wire to push it away from the other wire, a wire gripping member adapted to cause that wire to be gripped against the blade which pushes it, means for moving the blades simultaneously, and means operating concurrently with the movement of the blades for causing the gripping members to grip the wires against the blades, whereby the partially cut sheath will be torn apart.

3. Machine for separating the wires of a cable having insulated wires surrounded by a sheath of braided or woven material, comprising in combination, two oppositely movable blocks, a blade carried by each blade, said blades being arranged to split the sheath partway in from the end of the cable, each blade engageable with a wire to push it away from the other wire, a wire gripping finger pivotally attached to each block and adapted to cause that wire to be gripped against the blade carried by that block, means for moving the blocks simultaneously in opposite directions, and means responsive to said movement of the blocks for causing the gripping fingers to operate.

In testimony whereof I hereto affix my signature.

CLARENCE J. KELLER.